(No Model.)

A. J. CHAMBERLAIN.
RAKE.

No. 494,324. Patented Mar. 28, 1893.

Witnesses.
A. J. Tanner.
James Dundon

Inventor.
Alice J. Chamberlain.
By Geo. D. Phillips
Atty.

UNITED STATES PATENT OFFICE.

ALICE J. CHAMBERLAIN, OF BRIDGEPORT, CONNECTICUT.

RAKE.

SPECIFICATION forming part of Letters Patent No. 494,324, dated March 28, 1893.

Application filed May 4, 1888. Serial No. 272,780. (No model.)

*To all whom it may concern:*

Be it known that I, ALICE J. CHAMBERLAIN, a citizen of the United States, residing at Bridgeport, in the county of Fairfield and State of Connecticut, have invented certain new and useful Improvements in Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in hand rakes as hereinafter more fully described and particularly pointed out in the claim.

My invention as a new article of manufacture consists of a guard constructed preferably of woven wire or netting to be attached to the rake-head.

To more fully understand my invention reference is had to the drawings and to the letters of reference marked thereon forming a part of this specification.

Figure 1:
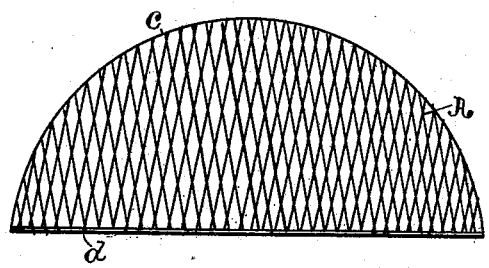
Figure 2:
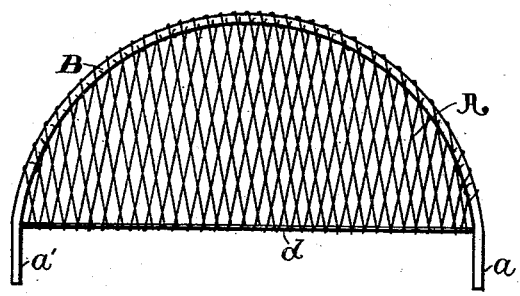
Figure 3:
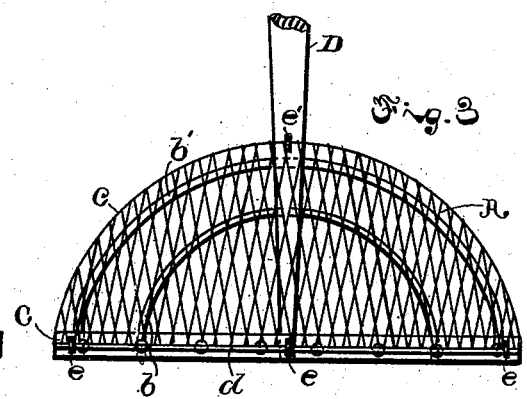
Figure 5:
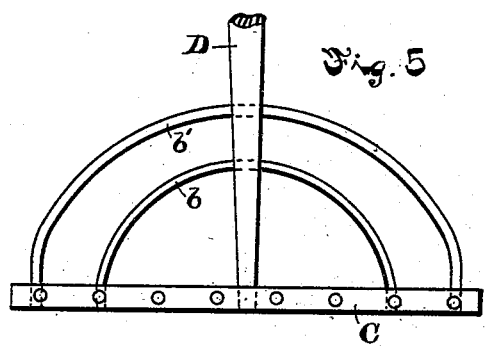
Figure 4:
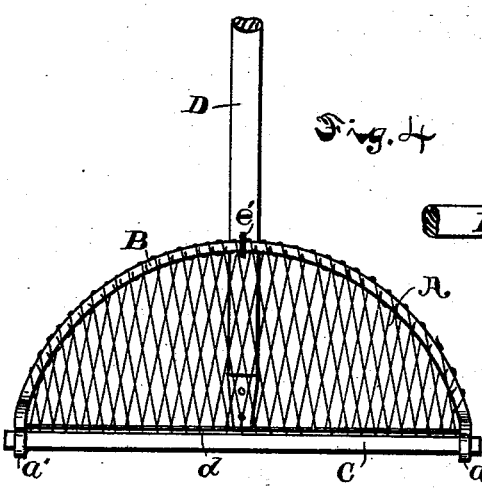
Figure 6:
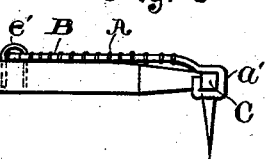

Figure 1 represents a plan view of the device. Fig. 2 is a similar view showing a slight change in its construction which consists in extending the wire which forms the semicircular edge of the guard, below the netting. Fig. 3. represents a plan view of a rake with the device as shown in Fig. 1 attached thereto. Fig. 4 represents a plan view of a rake, and showing the manner of attaching the device shown in Fig. 2. Fig. 5 represents a plan view of an ordinary form of wooden rake. Fig. 6 is a side elevation of Fig. 4.

Its construction and operation is as follows:

A. represents the guard; B. semicircular wire to which the netting is attached; a. projecting ends of said wire; C. rake-head; D. handle; e. e' staples to secure netting to rake-head.

The common wooden rake as now constructed (see Fig. 5) is usually provided with the ribs b. b'. passing through the handle D. and having their ends secured to the head C. These are intended to brace or strengthen the same, but they are not adapted to retain any surplus matter collected by the rake, especially when such matter consists of very fine particles.

In the above mentioned form of rake and also the iron or garden rake, (which has no ribs) the holding capacity of the rake is limited to the size of the head, and any surplus matter collected by the teeth will escape over the rake-head. To overcome this difficulty I have provided a guard preferably of wire netting, and preferably semicircular in shape, and calculated to be adapted to any style of rake, as this material and form is thought to be the most desirable for the purpose.

In Fig. 1 the guard is shown woven in the proper shape, the circle c. and base d. forming selvage edges. This device is attached to the rake-head and handle by the staples e. e'. as seen at Fig. 3.

In Fig. 2. the guard A. is cut from a sheet of netting and the wire B. attached to the semicircular edge, by simply binding the severed ends of the netting wire around the wire B. The ends a. a'. of said wire will project below the base d. of the guard. These projecting ends are bent or clasped around the iron rake-head C'. as seen at Fig. 4. In this case the staples e. are dispensed with, and staple e' on the handle is all that is required. It is evident that the latter method described of constructing and attaching the guard is applicable to either iron or wooden rakes.

I do not wish to be confined or limited to the exact construction, form, or shape, of the guard as shown, or manner of attaching the same, as these may be modified without departing from the spirit of my invention. But as the device illustrated and described possesses all the required qualifications being light, cheap and durable it is therefore preferred.

Having thus described my invention, what

I claim as new, and desire to secure by Letters Patent, is—

As a new article of manufacture the woven wire rake guard A. having the curved wire B. and straight base wire d. the netting attached to said wires, the ends a. a' of the wire B. projecting below the base wire d. such projecting ends forming one of the means for attaching said guard to the rake head. all substantially as shown and set forth.

In testimony whereof I affix my signature in presence of two witnesses.

ALICE J. CHAMBERLAIN.

Witnesses:
GEORGE D. PHILLIPS,
JAMES P. LOCKWOOD.